United States Patent
Ogawa

(10) Patent No.: US 7,085,210 B2
(45) Date of Patent: Aug. 1, 2006

(54) OPTICAL DISC DRIVE HAVING OPC CONTROL UNIT FOR CONTROLLING THE LEVEL OF POWER OF THE LASER BEAM FOR RECORDING AND READING DATA FROM AN OPTICAL DISC

(75) Inventor: Toshihiro Ogawa, Iruma (JP)

(73) Assignee: TEAC Corporation (JP)

(*) Notice: Subject to any disclaimer, the term of this patent is extended or adjusted under 35 U.S.C. 154(b) by 543 days.

(21) Appl. No.: 10/104,608

(22) Filed: Mar. 22, 2002

(65) Prior Publication Data

US 2002/0136123 A1 Sep. 26, 2002

(30) Foreign Application Priority Data

Mar. 23, 2001 (JP) .................... 2001-085451

(51) Int. Cl.
*G11B 5/09* (2006.01)

(52) U.S. Cl. ............... 369/47.53; 369/53.27

(58) Field of Classification Search ........... 369/47.5, 369/47.51, 47.53, 47.55, 53.12, 53.26, 53.27, 369/53.37, 116

See application file for complete search history.

(56) References Cited

U.S. PATENT DOCUMENTS 6,552,967 B1 * 4/2003 Tsutsui et al. ........... 369/13.27

FOREIGN PATENT DOCUMENTS

| JP | 05-143995 | 6/1993 |
| JP | 10-312568 | 11/1998 |
| JP | 2001-060320 | 3/2001 |

OTHER PUBLICATIONS

Japanese Office Action issued by the Japanese Patent Office in the basic Japanese Patent Application No. 2001-085451 citing the above reference.

* cited by examiner

*Primary Examiner*—Paul W. Huber
(74) *Attorney, Agent, or Firm*—Anderson Kill & Olick, PC

(57) ABSTRACT

An optical disc drive has an OPC control unit that records the signal to a plurality of frames in the predetermined test area on the optical disc using a plurality of recording power values and repeatedly records the signal to another plurality of frames in the predetermined test area on the optical disc using the plurality of recording power values, and calculates an average strength value of the reflected light of the plurality of strength values of the reflected lights from the plurality of frames in which frames the signal is recorded with the same recording power value, and the average strength value of the reflected light corresponding to the optimum recording power value is determined as an optimum strength value of the reflected light , during the OPC operation, and a recording power control unit that modifies the recording power value by a predetermined value in order to make the strength value of the reflected light from the pit portion during recording move toward the optimum strength value of the reflected light, during the running OPC operation. As a result, the present invention provides the optical disc drive, in which data can be recorded with an optimum recording power over the whole disc and both a jitter and an error rate of the reproduced signal are kept low.

4 Claims, 5 Drawing Sheets

OPTICAL DISC DRIVE HAVING OPC CONTROL UNIT FOR CONTROLLING THE LEVEL OF POWER OF THE LASER BEAM FOR RECORDING AND READING DATA FROM AN OPTICAL DISC

BACKGROUND OF THE INVENTION

1. Field of the Invention

The present invention generally relates to an optical disc drive, and more particularly to an optical disc drive which records data on the optical disc and reads the data from the optical disc.

2. Description of the Related Art

There are two types of recordable type optical discs, such as a write-once type and an erasable type. There are several methods to record data on the write-once type optical disc. In one method, Te or Bi is used for the material of a recording layer of the write-once type optical disc and pits are formed on the recording layer by means of melting the material by means of radiating a laser beam to the material. In another method, a thin film composed of a material such as $Sb_2Se_3$, TeOx or an organic dye is used for a recording layer of the write-once type optical disc and reflectance of the recording layer is changed by means of radiating a laser beam to the material.

A CD-R disc, which is the write-once type optical disc, has grooves that guide an optical spot. The grooves are wobbled at a center frequency of 22.05 kHz in a radial direction and address information during recording called ATIP (Absolute Time In Pregroove) is also recorded using FSK (Frequency Shift Keying) modulation, which modulates the frequency of 22.05 kHz within a maximum frequency deviation of ±1 kHz.

A recording signal format of the CD-R disc defines the areas that the CD-R disc has. A power calibration area (PCA), a program memory area (PMA), a read-in area, a program area and a read-out area are placed from a position at an inner radius toward a position at an outer radius of the CD-R disc. In the PCA, an optimum recording power is determined by means of writing a signal in the PCA and measuring a reproduced signal from the PCA. In the PMA, information such as signal recording information, skip information and, so on, is temporarily recorded during appending data to the CD-R disc.

To record the data on the CD-R disc properly, an optimum power control (OPC) operation is performed prior to recording the data on the CD-R disc. The strength of the laser beam is set to the optimum recording power value during the OPC operation. One hundred (100) test areas (partitions) are provided in the PCA for performing the OPC operation. Each test area (partition) has 15 frames.

The strength of the laser beam must be set to the optimum power value for each CD-R disc because recording characteristic parameters of one CD-R disc manufactured by one manufacturer are different from those of another CD-R disc that is manufactured by another manufacturer. When the data are recorded on the CD-R disc by means of the laser beam that does not have the optimum power for the CD-R disc, a jitter and an error rate of a reproduced signal might cause the reproduced signal to be degraded.

Conventionally, the signal is recorded using different power of the laser beam for each frame in one test area. For example, 15 levels of power of the laser beam are used for recording the signal to the 15 frames. Then, a peak value (P) and a bottom value (B) of an envelope of each reproduced RF signal from each frame in the test area are detected. Next, a value $\beta=(P+B)/(P-B)$ is calculated. If the value $\beta$ is greater than a predetermined value, for example 0.04, the power of the laser beam that is used for recording the signal to the frame from which the RF signal is reproduced is determined to be the optimum power of the laser beam. Then, data are recorded to the CD-R disc using the optimum power of the laser beam. A length of one test area (15 frames) of the PCA is equivalent to a length of about 1.7 revolutions of the CD-R disc track at the inner radius of the CD-R disc.

Further, in the standard of the optical disc, it is prescribed to carry out a running OPC when the data are recorded on the CD-R disc. During the running OPC, strength of a reflected light from a pit portion determined during the OPC operation is compared with the strength of the reflected light from a pit portion during recording data. The running OPC operation is such that a power of the laser beam for recording the data on the CD-R disc is being compensated continuously to keep the optimum recording power or the value $\beta$ that is obtained during the OPC operation, based on the comparison result mentioned above.

The strength of the reflected light is measured at a back end of the pit portion having a time interval of 11T, where T is about 230 ns (¼.32 MHz) at a standard speed of 1X.

Therefore, it is possible to compensate the power of the laser beam using the running OPC so as to keep the power of the laser beam at the optimum recording power as a sensitivity of the recording layer or a curve of the disc to the laser beam changes from the inner radius toward the outer radius.

However, if the curve of the disc is large, an incident angle of the laser beam to the data area at the outer radius of the CD-R disc is different from the incident angle of the laser beam to the PCA at the inner radius of the CD-R disc. Therefore, an effective laser light to record the data on the CD-R disc at the outer radius of the CD-R disc is so different from that at the inner radius of the CD-R disc that the optimum recording power at the outer radius of the CD-R disc is also different from that at the inner radius of the CD-R disc. Further, the conventional running OPC always compensates the optimum recording power based on the strength of the reflected light from the pit portion so as to become the strength of the reflected light equal to the strength of the reflected light determined by the OPC. Therefore, the recording power is compensated properly at a position of the inner radius of the CD-R disc even if the dye is not coated uniformly or the curve of the disc is large. As a result, the data are recorded properly. However, at a position of the outer radius of the CD-R disc, the actual optimum recording power is completely different from the optimum recording power determined during the OPC. The strength of the reflected light from the pit at the outer radius of the disc is different from the strength of the reflected light from the pit at the PCA of the disc during the OPC. When the data are appended at the position of the outer radius of the disc with the optimum recording power determined by the OPC, it takes a long time to control the actual recording power to become the actual optimum recording power at the outer radius of the disc by means of compensating the recording power using the running OPC. Therefore, it causes the problem that the jitter or the error rate of the reproduced signal becomes high until the recording power is controlled to the actual optimum recording power.

Further, the value $\beta$ fluctuates at a cycle of revolutions per minute (r.p.m.) of the disc or at a cycle of twice the r.p.m.

because of the mechanical characteristics such as dynamic axial runout and so on. Therefore, the strength of the reflected light and the value β measured during the OPC also fluctuate. As a result, the recording power cannot be compensated accurately if the running OPC is performed based on the strength of the reflected light from the pit during the OPC, because the error is included in the measurement value of the strength of the reflected light from the pit during the OPC. As a result, both the error rate and the jitter of the reproduced signal become high because it is impossible to keep the value β of the reproduced signal at the value β determined during OPC if the running OPC cannot keep the recording power at the optimum recording power.

SUMMARY OF THE INVENTION

It is a general object of the present invention to provide an optical disc drive, in which the above disadvantages are eliminated.

A more specific object of the present invention is to provide an optical disc drive, in which data can be recorded with an optimum recording power over the whole disc and both a jitter and an error rate of the reproduced signal are kept low.

The above objects of the present invention are achieved by an optical disc drive, which performs an OPC operation in which a signal is recorded in a predetermined test area on the optical disc using a plurality of recording power values, and an optimum recording power value and an optimum strength value of a reflected light from a pit portion are determined according to the characteristic values obtained from the reproduced signal from the predetermined test area, and which performs a running OPC operation in which the recording power value is adjusted so as to make the strength value of the reflected light from the pit portion during recording equal to an aimed strength value of the reflected light, comprising:

an OPC control unit that records the signal to a plurality of frames in the predetermined test area on the optical disc using a plurality of recording power values and repeatedly records the signal to another plurality of frames in the predetermined test area on the optical disc using the plurality of recording power values, and calculates an average strength value of the reflected light of the plurality of strength values of the reflected light from the plurality of frames in which frames the signal is recorded with the same recording power value, and the average strength value of the reflected light corresponding to the optimum recording power value is determined as an optimum strength value of the reflected light, during the OPC operation, and a recording power control unit that modifies the recording power value by a predetermined value in order to make the strength value of the reflected light from the pit portion during recording move toward the optimum strength value of the reflected light, during the running OPC operation.

According to the present invention, the optimum strength value of the reflected light is calculated as the average strength value of the strength values of the reflected light from the plurality of frames that are recorded repeatedly. Therefore, it is possible to prevent a jitter and an error rate of the reproduced signal from becoming high, by means of setting an accurate optimum strength value of the reflected light that is not affected by the dynamic axial runout and so on, because the optimum strength value of the reflected light is set based on the average strength value.

The above objects of the present invention are achieved by an optical disc drive, further comprising:

a last value holding unit that holds a last recording power value and/or a last strength value of the reflected light that are used during the last recording, and an aimed value setting unit, which sets the last recording power value and/or the last strength value of the reflected light as the aimed recording power value and/or the aimed strength value of the reflected light if the last recording power value and/or the last strength value of the reflected light are held in the last value holding unit at a start of recording, and which sets the optimum recording power value and/or the optimum strength value of the reflected light obtained during the OPC operation as the aimed recording power value and/or the aimed strength value of the reflected light if the last recording power value and/or the last strength value of the reflected light are not held in the last value holding unit.

According to the present invention, even if the strength of the reflected light at a position of the outer radius is different from the strength of the reflected light determined during the OPC operation, the running OPC operation is performed based on the last recording power value and/or the last strength value of the reflected light that are used during the last recording operation and are held in the last value holding unit. Therefore, the data can be recorded with the optimum recording power value over the whole disc and it is possible to prevent the jitter and the error rate of the reproduced signal from becoming high.

The above objects of the present invention are achieved by an optical disc drive, which performs an OPC operation in which a signal is recorded in a predetermined test area on the optical disc using a plurality of recording power values, and an optimum recording power value and an optimum strength value of a reflected light from a pit portion are determined according to the characteristic values obtained from the reproduced signal from the predetermined test area, and which performs a running OPC operation in which the recording power value is adjusted so as to make the strength value of the reflected light from the pit portion during recording equal to an aimed strength value of the reflected light, comprising:

a relation holding unit that holds a relation between the strength value of the reflected light and the recording power value during the OPC operation, and a recording power control unit, which obtains a recording power value, at which recording power value the strength value of the reflected light from the pit portion during recording in the running OPC operation is equal to the optimum strength value of the reflected light, based on both a difference between the strength value of the reflected light from the pit portion during recording in the running OPC operation and the optimum strength value of the reflected light, and the relation held in the relation holding unit, and then which controls an actual recording power value to the obtained recording power value.

According to the present invention, it is possible to set the optimum recording power value, which results in the optimum strength value of the reflected light, during the real-time running OPC operation.

The above objects of the present invention are achieved by an optical disc drive, which performs an OPC operation in which a signal is recorded in a predetermined test area on the optical disc using a plurality of recording power values, and an optimum recording power value and an optimum strength value of a reflected light from a pit portion are determined according to the characteristic values obtained from the reproduced signal from the predetermined test area, and which performs a running OPC operation in which the recording power value is adjusted so as to make the strength value of the reflected light from the pit portion during recording equal to an aimed strength value of the reflected light, comprising:

an offset level measurement unit that measures a level of reproduced signal while a laser diode is turned off as an offset level of a strength value of the reflected light, and an offset level compensation unit that compensates the strength value of the reflected light during the OPC operation and the running OPC operation using the offset level measured by the offset level measurement unit.

According to the present invention, it is possible to enhance the accuracy of measuring the strength value of the reflected light during the OPC operation and the running OPC operation.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

A first embodiment according to the present invention will be explained.

Figure 1:
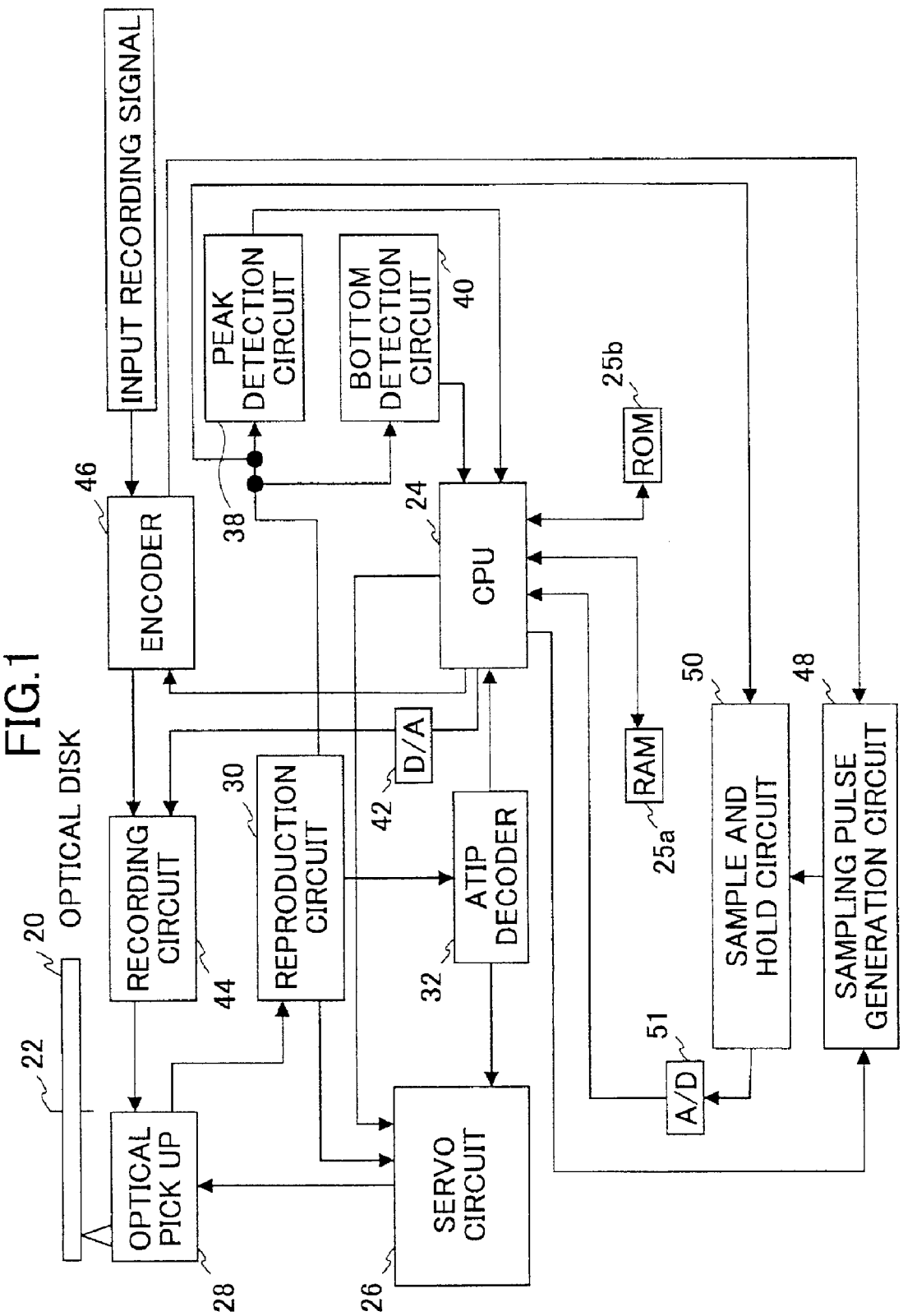
FIG. 1 shows a block diagram of an optical disc drive of an embodiment according to the present invention.

FIG. 1 shows a block diagram of an optical disc drive of an embodiment according to the present invention. In FIG. 1, an optical disc 20 is rotated by the spindle motor around a mandrel 22. A micro processor (CPU) 24 provides commands to a servo circuit 26 based on write/read commands provided by the upper apparatus described later.

The servo circuit 26 performs a CLV (constant linear velocity) servo operation to control the spindle motor. The servo circuit 26 also controls a sled motor to move an optical pick-up 28 to a desired block on the optical disc 20 and also executes a focusing servo control operation and a tracking servo control operation to the optical pick-up 28.

A laser beam radiated from the optical pick-up 28 is reflected from a recording layer of the optical disc 20 and the reflected laser beam is detected by the optical pick-up 28. The optical pick-up 28 generates a reproduced RF signal and the reproduced RF signal is supplied to the reproduction circuit 30. The reproduced RF signal is amplified by the reproduction circuit 30. The reproduction circuit 30 supplies the amplified reproduced RF signal to the servo circuit 26. The reproduction circuit 30 also EFM-demodulates the amplified reproduced RF signal and extracts the ATIP signal from the EFM-demodulated signal and supplies the extracted ATIP signal to an ATIP decoder 32. A synchronized demodulated signal is supplied to a decoder (not shown). The decoder (not shown) performs a CIRC (cross interleaved Reed Solomon code) decoding and an error correction to the synchronized demodulated signal and the error-corrected signal is output as reproduced data. The ATIP decoder 32 decodes the ATIP information, such as an ID number or various parameters and so on, and supplies the decoded ATIP information to the micro processor 24 and the servo circuit 26.

The reproduction circuit 30 supplies the reproduced signal to both a peak detection circuit 38 and a bottom detection circuit 40. The peak detection circuit 38 detects a peak value (P) of an envelope of the reproduced signal and supplies the peak value to the micro processor 24. The bottom detection circuit 40 detects a bottom value of the envelope of the reproduced signal and supplies the bottom value (B) to the micro processor 24.

The micro processor 24 calculates a value $\beta=(P+B)/(P-B)$ based on the peak value (P) and the bottom value (B), and generates a recording power control signal according to the value $\beta$. The recording power control signal is converted to an analog signal by a D/A converter 42 and the converted analog signal is supplied to a recording circuit 44 as a recording power control voltage. An encoder 46 encodes an input recording signal to the CIRC (cross interleaved Reed Solomon code) and the CIRC-encoded signal is supplied to the recording circuit 44 under the control of the micro processor 24.

The recording circuit 44 modulates the signal supplied from the encoder 46 to an EFM-signal during recording. The recording circuit 44 also controls the EFM-signal based on the recording power control voltage supplied from the D/A converter 42, and supplies the controlled EFM-signal to an laser diode (LD) in the optical pick-up 28. As a result, the laser beam is supplied to the optical disc 20 and a signal is recorded on the optical disc 20.

Figure 2:
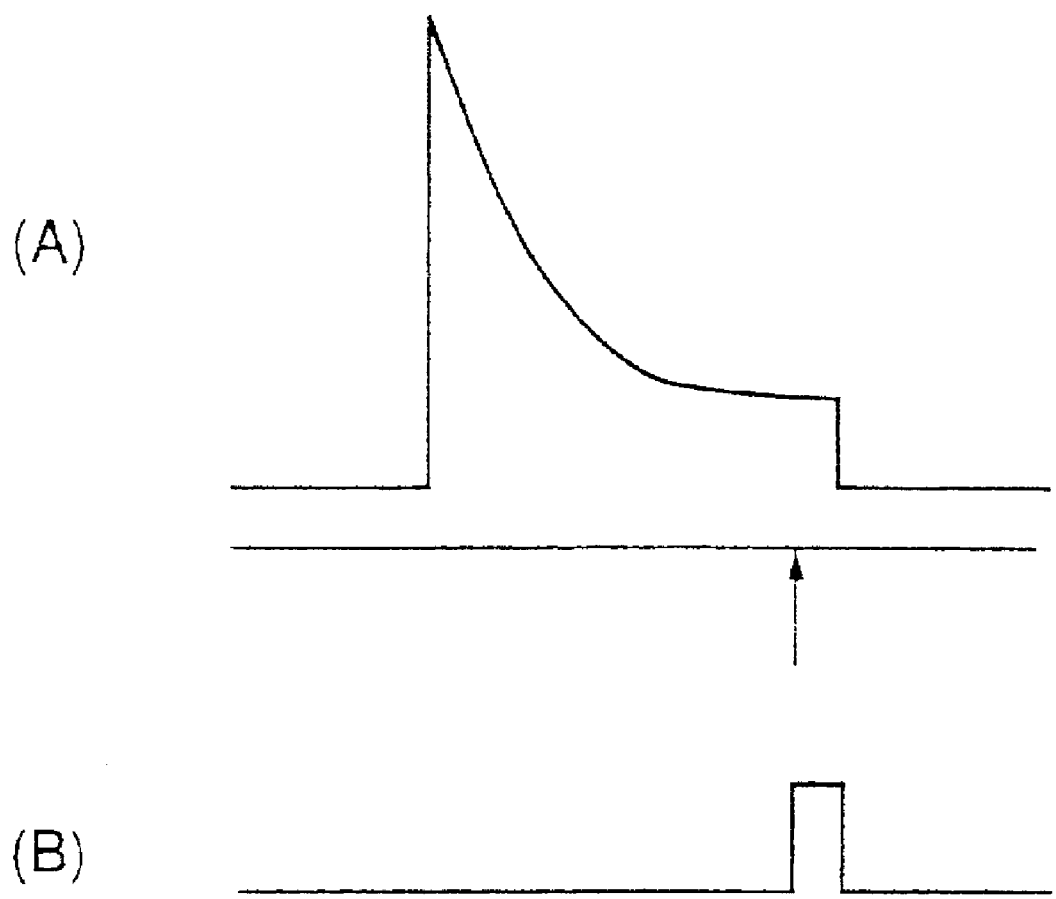
FIG. 2 shows timing diagrams of a relation between strength of reflected light from a pit and a sampling pulse during recording.

FIG. 2 shows timing diagrams of a relation between strength of reflected light from a pit and a sampling pulse during recording. FIG. 2(A) shows the strength of the reflected light from a pit having an 11T time interval. FIG. 2(B) shows the sampling pulse.

During the OPC operation and the running OPC operation, the encoder 44 supplies the recording signal to a sampling pulse generation circuit 48 and the micro processor 24 supplies a clock signal to the sampling pulse generation circuit 48; In a case that the pit having the 11T time interval is recorded, the sampling pulse generation circuit 48 generates the sampling pulse as shown in FIG. 2(B) and supplies the sampling pulse to a sample and hold circuit 50. This sampling pulse as shown in FIG. 2(B) is provided to sample the strength value of the reflected light from the pit having the 11T time interval at the back end of the pit as shown in FIG. 2(A). The sample and hold circuit 50 samples a level of the signal supplied from the reproduction circuit 30 with the sampling pulse as shown in FIG. 2(B), and holds the sampled level of the signal. This held level of the sampled signal, which is the strength value of the reflected light from the pit having the 11T time interval at the back end of the pit, is converted to a digital signal by an A/D converter 51 and the digital signal is supplied to the micro processor 24 and is stored in RAM 25a. This held level HB is dependant on a shape of the pit formed on the disc. Therefore, a held level HBs, which is a held level when a pit is recorded with an optimum recording power during the OPC, is recorded in ROM 25b, and the recording power is controlled based on the comparison result between the held level HBs and the held level which is sampled when the data is being recorded on the disc.

In the RAM 25a or the ROM 25b including an EEPROM, a history of the OPC and a last recording power P and/or a held level HB are stored. These stored values are held in the RAM 25a or the ROM 25b until a predetermined time interval elapses.

Further, the ROM 25b including an EEPROM that is connected to the micro processor 24 stores a type of the disc (ID number), a table of start power values and step power values for the OPC operation according to a recording velocity and a table of aimed value βo.

Figure 3:
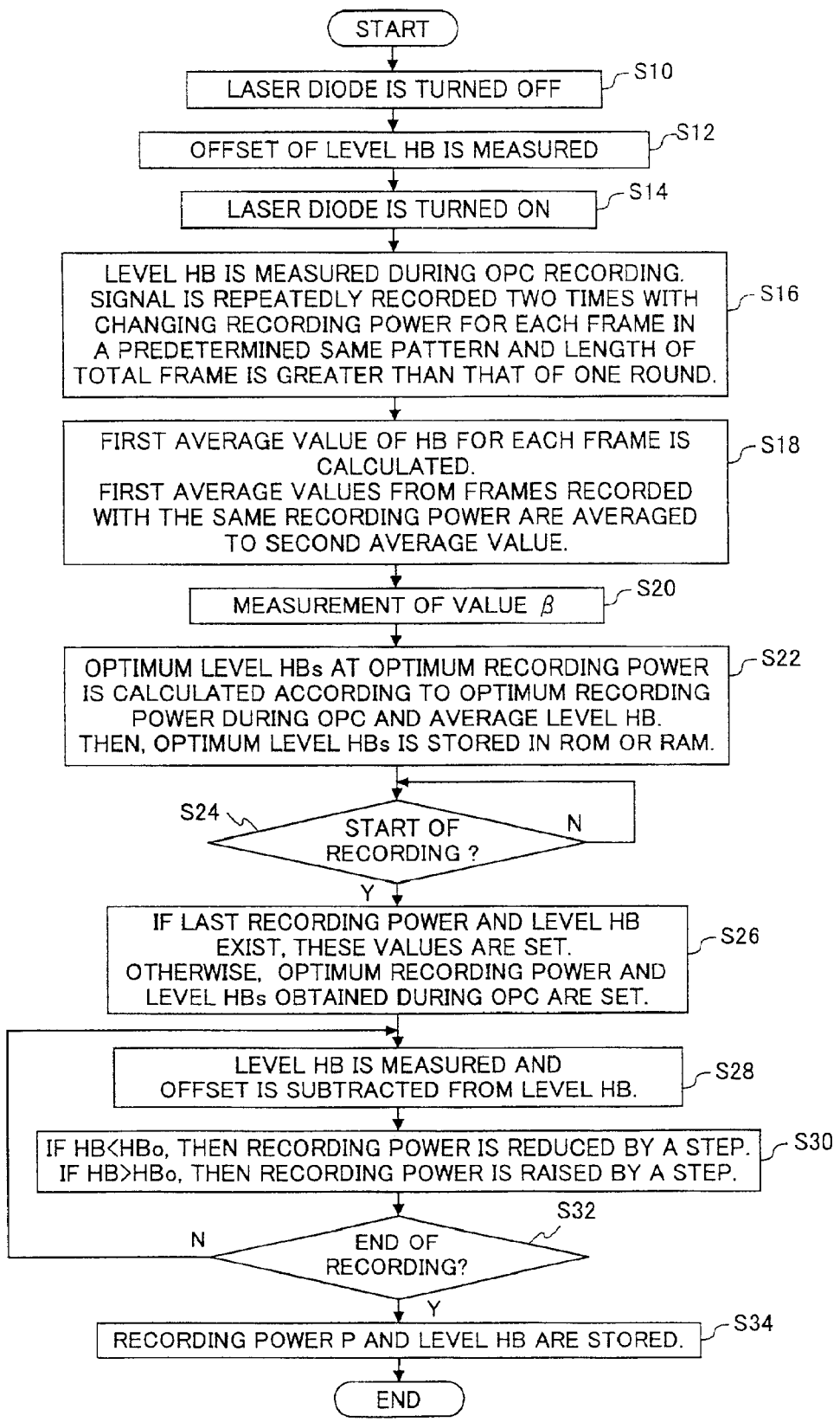
FIG. 3 shows a flow chart of an OPC operation and a running-OPC operation of a first embodiment according to the present invention.

FIG. 3 shows a flow chart of an OPC operation and a running-OPC operation of a first embodiment according to the present invention. The OPC operation and the running-OPC operation are performed by the micro processor 24. At step S10, the laser diode in the optical pick-up 28 is turned off, and at step S12, a held level HB in the sample and hold circuit 50 is measured and the measured held level is stored as an offset level in the RAM 25a.

Next, at step S14, the laser diode is turned on, and at step S16, the OPC recording operation is executed and the held level HB for each OPC recording frame is measured. When the held level HB for each OPC recording frame is measured, the offset measured at step S12 is subtracted from the held level HB to compensate for the offset level. In the OPC recording, first, the aimed value βo is read from the table stored in the ROM 25b according to the ID number and the recording velocity. Next, the start power values and the step power values for the OPC operation according to the recording velocity are read. Then, a test signal is recorded from a first frame to a fifth frame in one test area (15 frames) in the optical disc 20. The signal is recorded to the first frame with the start power (first stage), and then the signal is recorded to the second frame with a power that is increased by the step power value compared to the start power (second stage). Next, the signal is recorded to the third frame with a power that is increased by the step power value compared to the power used for recording the second frame (third stage). Then, the signal is recorded to the fourth frame with a power that is increased by the step power value compared to the power used for recording the third frame (fourth stage). Finally, the signal is recorded to the fifth frame with a power that is increased by the step power value compared to the power used for recording the fourth frame (fifth stage). The same recording operations from the fist stage to the fifth stage are repeated from a sixth frame to a tenth frame in the same test area (15 frames).

Next, at step S18, each first average held level HB for each frame is calculated. Then, each second average held level of the first average held levels HB, which are calculated for the frames recorded with the same recording power, such as the first frame and the sixth frame, is calculated. At step S20, each recorded signal for each frame from the first frame to the tenth frame is reproduced and the value β for each frame is calculated using the equation $\beta=(P+B)/(P-B)$ based on the peak value (P) and the bottom value (B) of the envelope of the reproduced signal. Next, each average level of the values β, which are calculated for the frames recorded with the same recording power, such as the first frame and the sixth frame, is calculated. Then, the optimum recording power Ps is calculated to obtain the aimed value βo and the optimum recording power Ps is stored in the RAM 25a or the ROM 25b. Next, at step S22, the optimum held level HBs (the strength of the reflected light) at the optimum recording power Ps is selected according to the optimum recording power Ps and each second average held level at each recording power. Then, the optimum held level HBs is stored in the RAM 25a or the ROM 25b along with the type of the optical disc (ID number) of the disc is being recorded on, the recording velocity, the last recording power and/or the held level HB that are used during the last recording corresponding to those at a recording start position if the last recording power and/or the held level HB are stored.

Next, at step S24, if it is decided that recording is started, the process advances to step S26. At step S26, if the last recording power and/or the last held level HB are used during the last recording are stored in the RAM 25a or the ROM 25b, then the last recording power and the last held level HB are set to the aimed recording power Po and the aimed held level HBo. If the last recording power and/or the last held level HB that are used during the last recording are not stored in the RAM 25a or the ROM 25b, then the optimum recording power value Ps and the optimum held level HBs obtained during the OPC operation are set to the aimed recording power Po and the aimed held level HBo. From that time, the data are recorded on the disc with the recording power.

Next, at step S28, during recording, the held level HB is measured and the offset measured at the step S12 is subtracted from the held level HB to compensate for the offset level. Next, at step S30, the offset-compensated held level HB is compared with the aimed held level HBo. If HB is less than HBo, then it is decided that the recording power is too high. Therefore, the recording power P is adjusted to a value that is reduced by a predetermined value. If HB is greater than HBo, then it is decided that the recording power is too low. Therefore, the recording power P is adjusted to a value that is raised by a predetermined value.

At step S32, if it is decided that the recording is not finished, the process returns to step S28 and continues recording the data. If it is decided that the recording is finished, the process advances to step S34. At step S34, the present recording power P and/or the present held level HB are stored in the RAM 25a or the ROM 25b and the process is terminated.

As described above, the data are repeatedly recorded to a plurality of frames in one test area during the OPC operation so that total length of the frames in which the signal is recorded becomes longer than a length of one revolution of the disc track at the inner radius. Then, the average strength of the reflected light from the frames, in which frames the data are recorded with the same recording power, is calculated, and the average strength value of the reflected light corresponding to the optimum recording power is set to the optimum strength value of the reflected light. Therefore, the optimum strength value of the reflected light is determined based on the average strength value of the reflected light from the frames placed at various locations along the circumference at the inner radius. As a result, it is possible to prevent a jitter and an error rate of the reproduced signal from becoming high, by means of setting an accurate optimum strength value of the reflected light that is not affected by the dynamic axial runout and so on, because the optimum strength value of the reflected light is set based on the average strength value.

Further, if the last recording power and/or the last strength of the reflected light are stored in the RAM 25a or the ROM 25b at the start of the recording, then the last recording power and the last strength of the reflected light are set to the aimed recording power and/or the aimed strength of the reflected light. If the last recording power and/or the last strength of the reflected light are not stored in the RAM 25a or the ROM 25b, then the optimum recording power and the optimum strength of the reflected light obtained during the OPC operation are set to the aimed recording power and/or the aimed strength of the reflected light. As a result, even if the strength of the reflected light at the outer radius is different from the strength of the reflected light determined during the OPC, the running OPC is performed based on the last recording power and/or the last strength of the reflected light that are used at the last recording and are stored in the RAM 25a or the ROM 25b. Therefore, the data can be recorded with the optimum recording power over the whole disc and it is possible to prevent the jitter and the error rate of the reproduced signal from becoming high.

Figure 4:
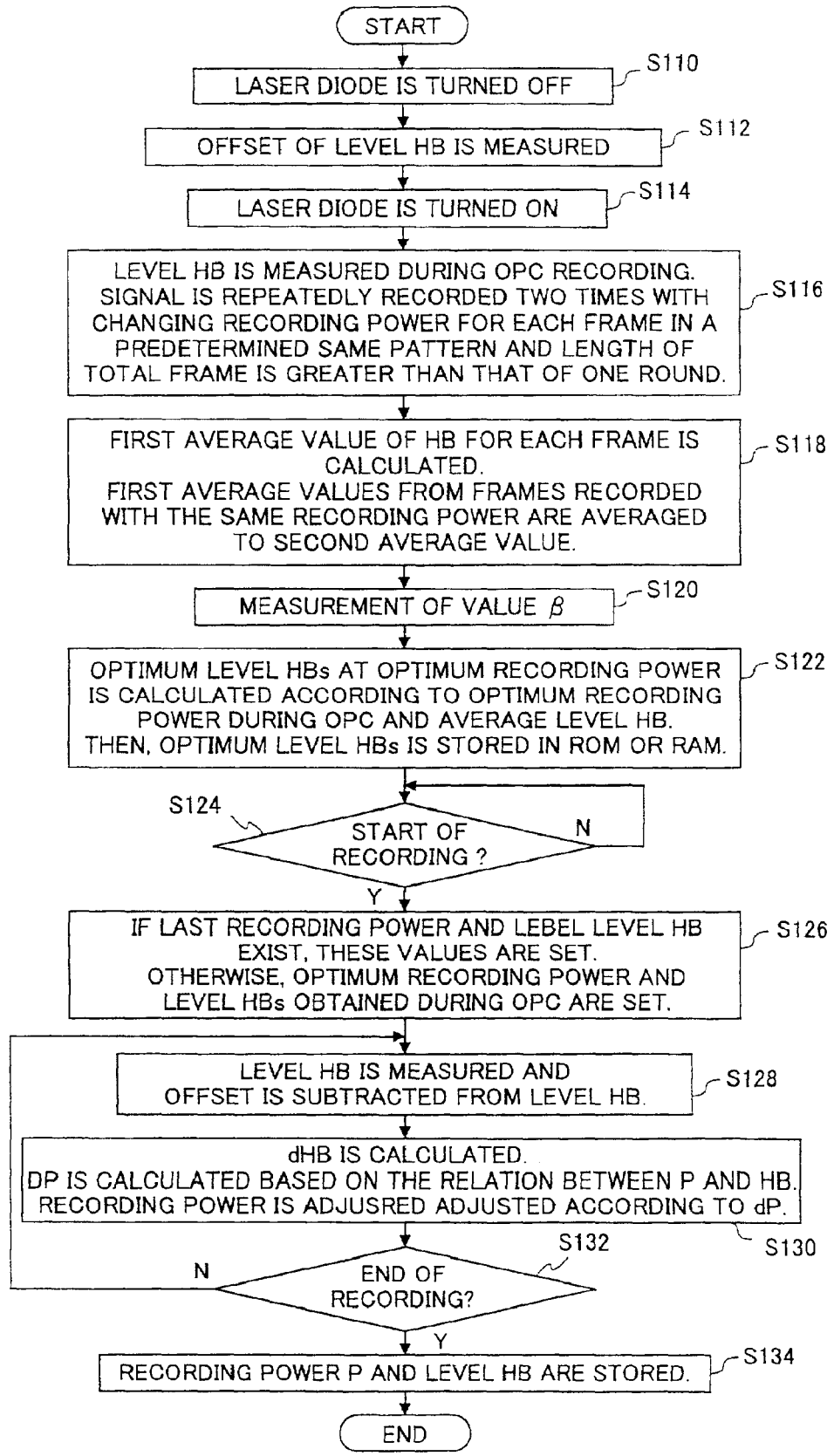
FIG. 4 shows a flow chart of an OPC operation and a running-OPC operation of a second embodiment according to the present invention.

FIG. 4 shows a flow chart of an OPC operation and a running-OPC operation of a first embodiment according to the present invention. The OPC operation and the running-OPC operation are performed by the micro processor 24. At step S110, the laser diode in the optical pick-up 28 is turned off, and at step S112, a held level HB in the sample and hold circuit 50 is measured and the measured held level is stored as an offset level in the RAM 25a.

Next, at step S114, the laser diode is turned on, and at step S116, the OPC recording operation is executed and the held level HB for each OPC recording frame is measured. When the held level HB for each OPC recording frame is measured, the offset measured at step S112 is subtracted from the held level HB to compensate for the offset level. In the OPC recording, first, the aimed value βo is read from the table stored in the ROM 25b according to the ID number and the recording velocity. Next, the start power values and the step power values for the OPC operation according to the recording velocity are read. Then, a test signal is recorded from a first frame to a fifth frame in one test area (15 frames) in the optical disc 20. The signal is recorded to the first frame with the start power (first stage), and then the signal is recorded to the second frame with a power that is increased by the step power value compared to the start power (second stage). Next, the signal is recorded to the third frame with a power that is increased by the step power value compared to the power used for recording the second frame (third stage). Then, the signal is recorded to the fourth frame with a power that is increased by the step power value compared to the power used for recording the third frame (fourth stage). Finally, the signal is recorded to the fifth frame with a power that is increased by the step power value compared to the power used for recording the fourth frame (fifth stage). The same recording operations from the fist stage to the fifth stage are repeated from a sixth frame to a tenth frame in the same test area (15 frames).

Next, at step S118, each first average held level HB for each frame is calculated. Then, each second average held level of the first average held levels HB, that are calculated for the frames recorded with the same recording power, such as the first frame and the sixth frame, is calculated. At step S120, each recorded signal for each frame from the first frame to the tenth frame is reproduced and the value β for each frame is calculated using the equation $\beta=(P+B)/(P-B)$ based on the peak value (P) and the bottom value (B) of the envelope of the reproduced signal. Next, each average level of the values β, which are calculated for the frames recorded with the same recording power, such as the first frame and the sixth frame, is calculated. Then, the optimum recording power Ps is calculated to obtain the aimed value βo and the optimum recording power Ps is stored in the RAM 25a or the ROM 25b. Next, at step S122, the optimum held level HBs at the optimum recording power Ps is selected according to the optimum recording power Ps and each second average held level at each recording power. Then, the optimum held level HBs is stored in the RAM 25a or the ROM 25b along with the type of the optical disc (ID number) of the disc being recorded on, the recording velocity, the last recording power and/or the held level HB that are used during the last recording corresponding to those at a recording start position if the last recording power and/or the held level HB are stored. Further, each average held level HB for each recording power is also stored in the RAM 25a or ROM 25b.

Next, at step S124, if it is decided that recording is started, the process advances to step S126. At step S126, if the last recording power and/or the last held level HB are used during the last recording are stored in the RAM 25a or the ROM 25b, then the last recording power and the last held level HB are set to the aimed recording power Po and the aimed held level HBo. If the last recording power and/or the last held level HB which are used during the last recording are not stored in the RAM 25a or the ROM 25b, then the optimum recording power value Ps and the optimum held level HBs obtained during the OPC operation are set to the aimed recording power Po and the aimed held level HBo. From that time, the data are recorded on the disc with the recording power.

Figure 5:
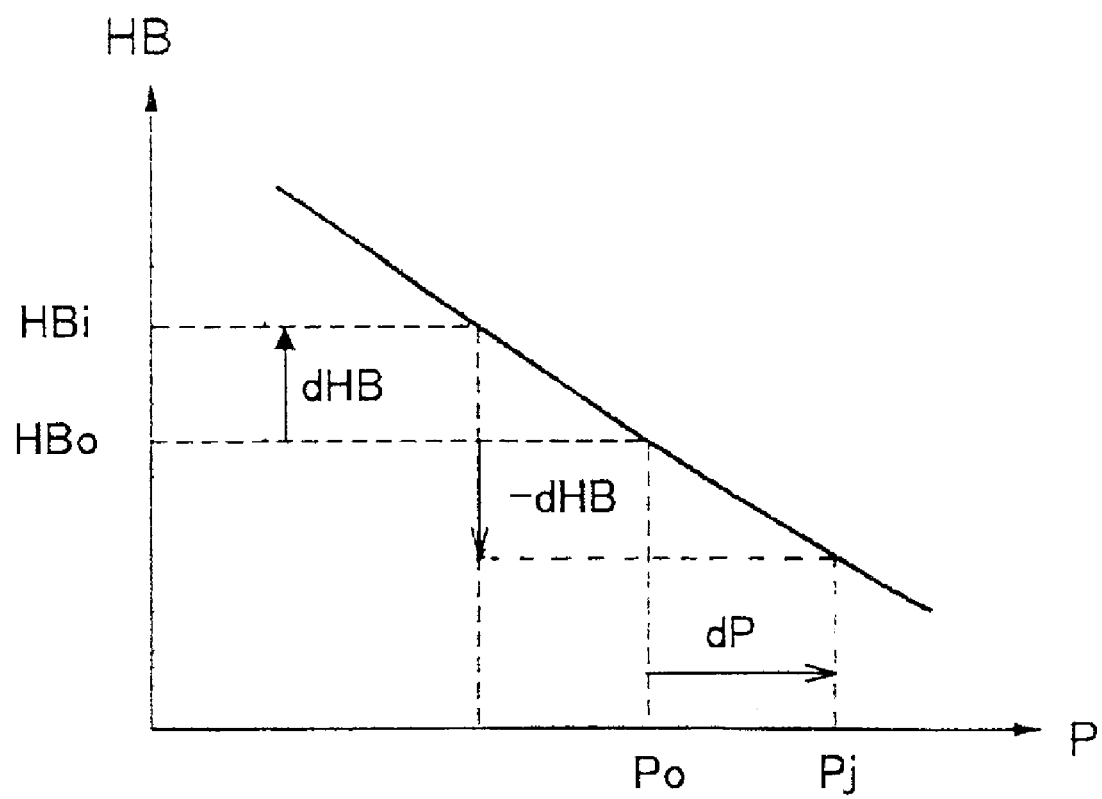
FIG. 5 shows a relation between a recording power value and a hold level HB.

Next, at step S128, during recording, the held level HB is measured and the offset measured at the step S112 is subtracted from the held level HB to compensate for the offset level. Next, at step S130, the aimed held level HBo is subtracted from the compensated held level HBi as shown in FIG. 5 and a difference dHB is calculated. A bold line as shown in FIG. 5 shows a relation between a recording power value and an average held level HB and the relation is stored in the RAM 25a or the ROM 25b. A value dP to be used for adjustment is calculated from the difference dHB based on the relation as shown in FIG. 5 and the recording power is modified by the value dP. In FIG. 5, the data are recorded with the aimed recording power, however, an actual strength value of the reflected light is a value of HBi. Therefore, the recording power is raised from the value Po to a value Pj by dP. As a result, the actual strength value of the reflected light changes from the value HBi to a value HBo.

At step S132, if it is decided that the recording is not finished, the process returns to step S128 and continues recording the data. If it is decided that the recording is finished, the process advances to step S134. At step S134, the present recording power P and/or the present held level HB are stored in the RAM 25a or the ROM 25b and the process is terminated.

As described above, a recording power value is obtained, at which recording power value the strength value of the reflected light during recording in the running OPC operation is equal to the optimum strength value of the reflected light, based on both a difference between the strength value of the reflected light during recording in the running OPC operation and the optimum strength value of the reflected light, and the relation between the average strength value of the reflected light and the recording power value during the OPC operation held in the ROM 25b, and then an actual recording power value is set to the optimum recording power value in real time operation during the running OPC operation.

As described above, the present invention is described with reference to the write-once type optical disc such as CD-R. However, the present invention can be applied to other recordable types of the optical discs, for which the power calibration is needed.

The steps S16 and S116 correspond to the OPC control unit as enumerated in the claims. The steps S30 and S130 correspond to the recording power control unit as enumerated in the claims. The steps S34 and S134 correspond to the last value holding unit as enumerated in the claims. The steps S26 and S126 correspond to the aimed value setting unit as enumerated in the claims. The RAM 25a and ROM 25b correspond to the relation holding unit as enumerated in the claims. The steps S12 and S112 correspond to the offset level measurement unit as enumerated in claims. The steps S16, S28, S116 and S128 correspond to the offset level compensation unit as enumerated in claims.

The present invention is not limited to the specifically disclosed embodiments, and variations and modifications may be made without departing from the scope of the present invention.

The present application is based on Japanese priority application No.2001-085451 filed on Mar. 23, 2001 the entire contents of which are hereby incorporated by reference.

What is claimed is:

1. An optical disc drive, which performs an OPC operation in which a signal is recorded in a predetermined test area on an optical disc using a plurality of recording power levels, and an optimum recording power level and an optimum strength level of a reflected light from a pit portion are determined according to the characteristic values obtained from a reproduced signal from said predetermined test area, and which performs a running OPC operation in which the recording power level is adjusted so as to make a strength level of the reflected light from the pit portion during recording equal to an aimed strength level of the reflected light, comprising:

an OPC control unit that has an average level calculator and an optimum strength level setting unit, wherein said average level calculator, during the OPC operation, divides said predetermined test area into a first area consisting of a plurality of first frames and a second area consisting of a plurality of second frames that are placed at various angular locations alone a circumference of said optical disc, performs recording of the first and second areas using the same plurality of recording power levels such that the first and second frames placed at various angular locations on said optical disc are recorded with the same recording power levels, and calculates an average strength level of the reflected light from the first and second frames for each of the same recording power levels, and said optimum strength level setting unit sets the optimum strength level corresponding to said optimum recording power level based on the calculated average strength levels, and a recording power control unit that, during the running OPC operation, performs comparisons between the optimum strength level and the strength level of light reflected from the pit portion during recording, and modifies the recording power level by a predetermined value in order to make said strength level of said reflected light move toward said optimum strength level based on the result of the comparisons.

2. The optical disc drive as claimed in claim 1, further comprising:

a last value holding unit that holds a last recording power level that has been modified by the recording power control unit during the last recording in the running OPC operation and/or the strength level of the reflected light associated with the recording position thereof, and an aimed value setting unit, which sets the last recording power level and/or the last strength level of the reflected light as the aimed recording power level and/or the aimed strength level of the reflected light if the last recording power level and/or the last strength level of the reflected light corresponding to a recording start portion are held in said last value holding unit at a start of recording, and which sets said optimum recording power level and/or said optimum strength level of the reflected light obtained during said OPC operation as the aimed recording power level and/or the aimed strength level of the reflected light if the last recording power level and/or the last strength level of the reflected light are not held in said last value holding unit, wherein after the recording initiated with the aimed recording power level set at a start of the recording, the recording power control unit performs comparisons between the optimum strength level and the strength level of the light reflected from the pit portion during recording, and modifies the recording power level by a predetermined value in order to make said strength level of said reflected light move toward said optimum strength level based on the result of the comparisons.

3. An optical disc drive, which performs an OPC operation in which a signal is recorded in a predetermined test area on an optical disc using a plurality of recording power levels, and an optimum recording power level and an optimum strength level of a reflected light from a pit portion are determined according to the characteristic values obtained from a reproduced signal from said predetermined test area, and which performs a running OPC operation in which the recording power level is adjusted so as to make a strength level of the reflected light from the pit portion during recording equal to an aimed strength level of the reflected light, comprising:

a relation holding unit that holds relations between the recording power level and the strength level of the light reflected from the pit portion at the recording with said recording power level, for each of the recording power levels, during said OPC operation, and a recording power control unit that calculates an adjusting level, based on both a difference between the strength level of the reflected light from the pit portion during recording with the recording power level in the running OPC operation and said optimum strength level of the reflected light, and said relations held in said relation holding unit, so as to make the strength level of the reflected light from the pit portion during recording in the running OPC operation equal to the optimum strength level of the reflected light, and controls a recording power level during recording in the running OPC based on the adjusting level.

4. An optical disc drive, which performs an OPC operation in which a signal is recorded in a predetermined test area on an optical disc using a plurality of recording power levels, and an optimum recording power level and an optimum strength level of a reflected light from a pit portion are determined according to the characteristic values obtained from a reproduced signal from said predetermined test area, and which performs a running OPC operation in which the recording power level is adjusted so as to make a strength level of the reflected light from the pit portion during recording equal to an aimed strength level of the reflected light, comprising:

an offset level measurement unit that measures a level of the reproduced signal while a laser diode is turned off as an offset level of a strength level of the reflected light, and an offset level compensation unit that compensates the strength level of the reflected light during the OPC operation and the running OPC operation using said offset level measured by said offset level measurement unit.

* * * * *